Nov. 16, 1965
R. R. CORDELL ETAL
3,217,549
AUTOMATIC SAMPLING DEVICE
Filed Oct. 7, 1963
2 Sheets-Sheet 1
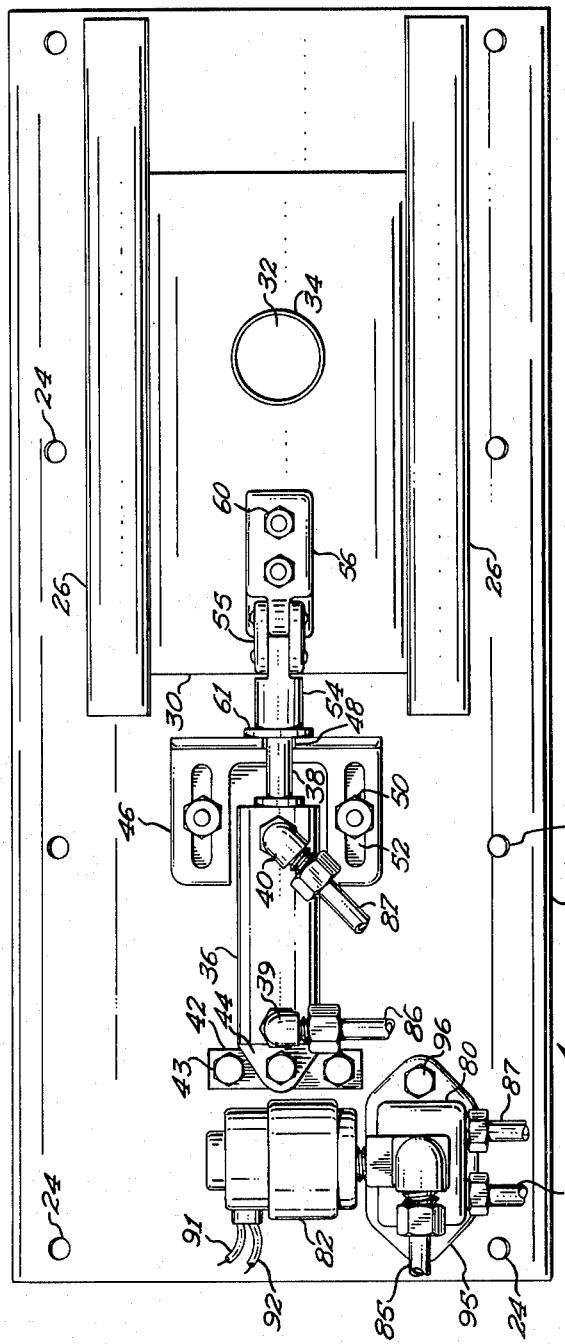
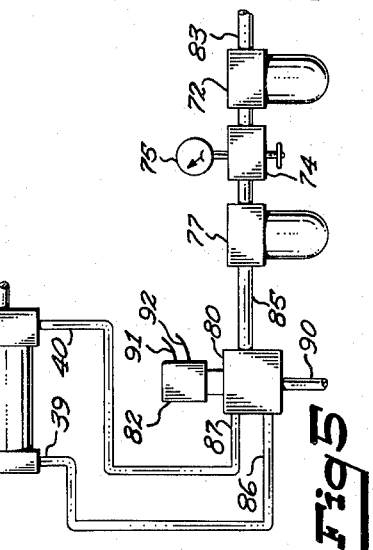
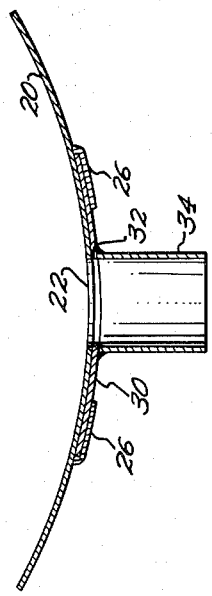
INVENTORS
WAYNE F. GUSTAFSON,
RAY R. CORDELL
BY
Schroeder & Siegfried
ATTORNEYS

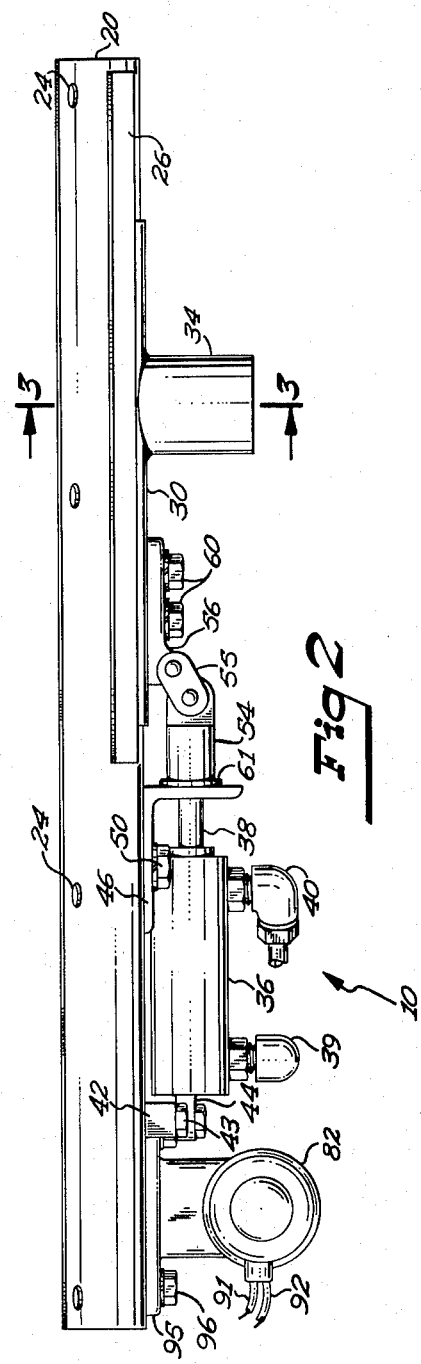
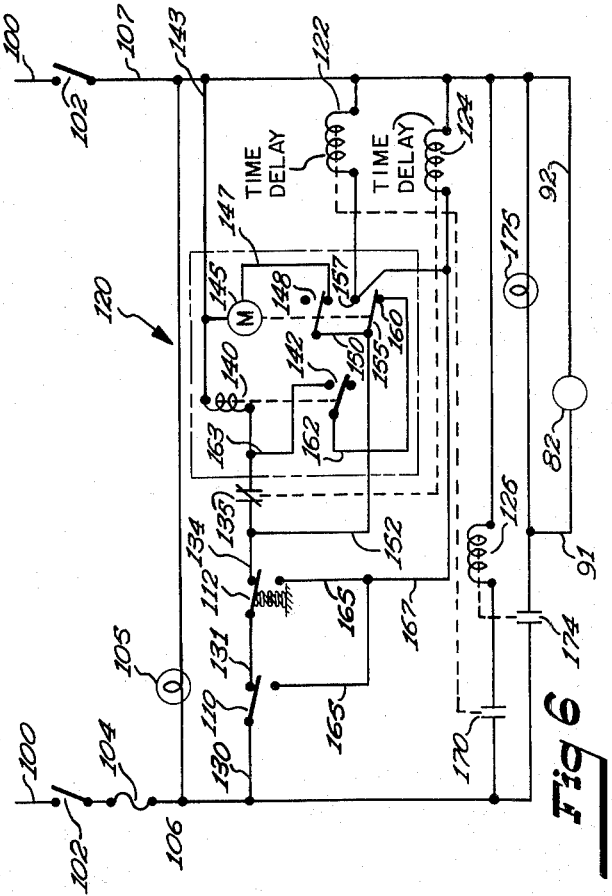
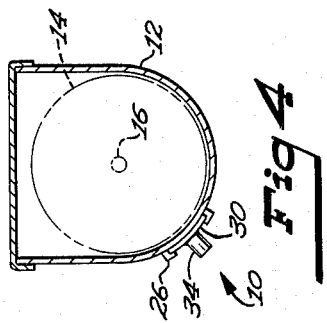
INVENTORS
WAYNE F. GUSTAFSON,
RAY R. CORDELL
BY
Schroeder & Siegfried
ATTORNEYS United States Patent Office 3,217,549
Patented Nov. 16, 1965

3,217,549
AUTOMATIC SAMPLING DEVICE
Ray R. Cordell and Wayne F. Gustafson, Minneapolis, Minn., assignors to Gustafson Manufacturing Company, Minneapolis, Minn.
Filed Oct. 7, 1963, Ser. No. 314,285
11 Claims. (Cl. 73—423)

This invention relates to sampling devices of the automatic type for sampling granular and powdery material in bulk and more particularly to an improved automatic sampling device for taking samples of granular material which are being conveyed through a tube or conduit having an auger therein for moving the granular material within the conduit.

While auger type conveying apparatus for granular material and sampling devices for the same are known and in use, they generally present a disadvantage in not being able to obtain an accurate sample from the sampling device and generally require complex valving and sample conveying arrangements to incorporate a sampling apparatus in a conveying line. Where the auger type conveyors are extremely long and large, it is difficult to obtain an accurate sample, since the valving arrangement of the sampling device is unable to be adjusted to sample over the entire movement of the granular material along the auger. For this reason, truly representative samples of the material being conveyed are not available when either the speed of the conveying apparatus or the type of material involved is changed.

The present invention is directed to an accurate and automatic sampling device particularly adapted for use in large auger type conveying apparatus with a simplified valving arrangement so that it can be readily mounted on and associated with the conveying line without requiring a large space for installation. This improved automatic sampling device utilizes a sliding plate type valve which fits on conveying tubes or conduits and is readily adjustable as to valve opening. It is also controlled with respect to the length of time which the valve will remain open to provide any desired sampling period required for a given material or given auger speed. Thus, the samples taken therefrom may be truly representative of a mean or average of the material in an entire storage bin.

Therefore, it it an object of this invention to provide an improved automatic sampling device for auger type conveying apparatus.

Further, it is an object of this invention to provide an improved automatic sampling device for granular or powdery material which is adjustable to provide for reliability and accuracy in the sampling operation.

Another object of this invention is to provide an improved sampling device for an auger type conveyor which is applicable to continuous sampling operation or at will without disturbing the continuous sampling operation.

Still another object of this invention is to provide an improved automatic sampling device in which the amount of the sample may be readily adjusted.

A still further object of this invention is to provide an improved automatic sampling device which includes a simplified valve structure that is reliable in operation and insures removal of the prior sample before a new sample is obtained.

Another object of this invention is to provide an automatice sampling device for an auger type conveyor which is relatively compact and simple in design and is inexpensive to manufacture and install.

These and other objects of this invention will become apparent from a reading of the attached description together with the drawings wherein:

FIGURE 1 is a plan view of the improved automatic sampling device,

FIGURE 2 is a side elevation view of the device shown in FIGURE 1,

FIGURE 3 is a sectional view of the sampling device taken along lines 3—3 of FIGURE 2, FIGURE 4 is a schematic diagram of the location of the improved sampling device on an auger type conveyor apparatus, FIGURE 5 is a pneumatic control circuit for the improved sampling device, and FIGURE 6 is an electrical schematic circuit of the improved sampling device.

Our improved sampling device for auger type conveyors is shown in plan and elevation views in FIGURES 1 and 2 respectively with the general designation of the numeral 10. This improved sampling device is particularly adapted to be mounted on the side of a conveying tube having an auger type conveying mechanism therein for the movement of granular or powdery materials, as will be best seen in FIGURE 4. Such a conveyor normally will include a tubular conduit, such as is indicated by the numeral 12, which is generally circular in cross section and designed to house an auger member 14 which is circular in cross section and will extend longitudinally along the extent of the conduit. Such auger type conveyors are normally quite long and will normally extend through a storage bin and a pipe or conduit to a discharge point. The rotating axis of the auger will normally be concentric with the circular portion of the cross section of the conveying tube, such as is indicated by the shaft 16 of the auger, and the peripheral surface of the auger will be in close proximity to this surface of the conveying tube or conduit for effective moving of the granular and powdery material therein.

As will be seen in FIGURE 4, our improved sampling device is particularly adapted to be mounted on such a conveying conduit with an auger therein in close proximity to the surface of the auger. Further, the improved sampling device will normally be mounted below the axis of the auger, as indicated by the shaft 16, with the preferable location being roughly 45° from the vertical plane extending through the axis of the auger. In the mounting of the improved sampling device, a hole or suitable aperture is cut or formed in the wall of the conveying tube at the point which the sampling device is to be located, which hole or aperture will be of the same size as the passages through the sampling device, as will be hereinafter noted. Although the improved sampling device is preferably mounted on the conveying tube with an auger therein, it may be included in a discharge chute if desired. The physical dimensions and the desired mounting position of the improved sampling device make it particularly adaptable for mounting on auger type conveyor lines in the handling of granular and powdery material to provide for accurate sampling of the same.

Our improved sampling device is shown in FIGURES 1 and 2 as including a base plate or mounting plate 20 which is rectangular in form and curved along its width to fit flush against the curved wall of a curved conveying tube. This elongated, thin mounting plate has an aperture therein at 22, best seen in FIGURE 3, which is normally of the same size as the sample opening in the conveying tube and is aligned with such an opening when the sampling device is mounted on the conveying tube or discharge chute. The curved mounting plate 20 is adapted to be mounted on the conveying tube or discharge chute through suitable mounting means, such as screws or bolts, which extend through a plurality of apertures 24 in the mounting plate along the edges thereof. Also mounted on the plate 20 are a pair of guide rails 26 which are positioned to either side of the hole 22 in the mounting plate and extend normally parallel to one another. The guide rails or guide means 26 may be suitably secured to the plate, such as by welding. These guide rails, except for their connecting part to the mounting plate 20, are slightly raised therefrom and mount a smaller and second plate 30 also having an aperture or hole 32 therein which is basically the same size as the hole 22 in the mounting plate 20. Plate 30 is designed to be retained between the guide rails 26 on the mounting plate 20 and to be slidable along and against the mounting plate 20 such that the holes or apertures 32 and 22 align. These plates with the holes therein form a sliding valve controlling the discharge from the sample opening in the conveying tube. The plate 30 includes a cylindrical flange member or sample discharge chute 34 mounted on and suitably attached to the plate 30 encircling the hole 32 through suitable means such as welding. Plate 30 is slidably mounted on the mounting plate 20 normally between positions in which the holes 32 and 22 respectively are out of alignment defining a valve closed position and to a position in which the holes are in exact alignment defining a valve open position. For control of the size of sample to be taken from the improved sampling device, this maximum valve open position may be adjusted by limiting the position or movement of the plate 30 with respect to the mounting plate 20 so that only partial alignment of these holes is provided, as will be later described.

The valve plate 30 is adapted to be moved along the guide rails or means 26 on the mounting plate 20 for operation of the valve formed between these members through the operation of a fluid type actuator, indicated at 36. In the present disclosure, this actuator is a pneumatic actuator or ram to which compressed air is adapted to be fed selectively at either extremity of the actuator to control the movement or positioning of an output shaft 38 of the actuator. Thus, as will be seen in FIGURES 1 and 2, actuator 36, which is generally cylindrical in configuration, has a pair of fluid pressure ports 39, 40 at the extremities of the same which are indicated by the coupling members into which the air is directed for movement of the shaft 38. The internal details of the actuator 36 are omitted for simplicity since it may take many forms and any suitable actuator which is by-directionally controlled through a pair of fluid ports to reversibly position an output shaft may be utilized. The actuator 36 is mounted on the plate 20 through a suitable bracket 42 connected to the plate 20 through screw means 43 and to the actuator through a flange portion 44. The actuator 36, at the shaft end, is supported and the shaft is guide through an adjustable guide flange 46 having a guide slot 48 therein. Flange 46 is mounted on the plate 20 through suitable nut and bolt connections, indicated at 50, which are positioned through elongated slots 52 in the flange 46 for adjusting the position of the same on the mounting plate 20. The extremity of the shaft 38 includes a coupling member 54 with a movable link 55 thereon which is connected to a flange 56 mounted on the plate 30 through suitable metal screw or bolt means 60 to connect the actuator to the plate 30 and also support it on plate 20. The coupling member 54 on the shaft 38 includes a circular flange stop member 61 adapted to bear against the edge or upstanding portion of the guide flange 46 for limiting the movement of the shaft 38 in one direction and hence the plate 30 which is connected thereto on plate 20.

Also mounted on the curved mounting plate 20 is a four-way control valve 80 operated through a solenoid portion 82 thereof. Valve 80 is mounted on plate 20 through a bracket 95 secured by bolts 96 thereon. This valve normally has associated therewith a pneumatic source assembly comprised basically of a filter 72, a pressure regulating valve 74 with a meter 75 associated therewith, and an oil bath 77. This arrangement of parts is shown schematically in the pneumatic circuit of FIGURE 5 and is omitted in FIGURES 1 and 2 for simplicity. It may be mounted on plate 20 or apart from the same. In FIGURE 5, a supply air source is connected to an input pipe 83 at the filter 72 of the source assembly which includes the valve 74, meter 75 interconnected with the oil bath 77 leading to a pipe, indicated at 85, at the input of the four-way valve 80. The four-way valve includes pipe conduits 86, 87 connected to the extremities of or port 39, 40 of the actuator with an exhaust conduit 90 also extending from the valve 80 to complete the pneumatic circuit. A solenoid 82 or electrical actuator portion of the valve 80 has electrical connectors 91, 92 extending therefrom which are connected in an electrical circuit in a manner later to be described. In the plan and elevation views of FIGURES 1 and 2, the connections of the piping conduits 86, 88 which lead from the valve 80 to the coupling members 39, 40 are shown broken for simplicity. These connections are normally made with flexible piping material. Thus, the pneumatic source will normally be regulated and contain sufficient lubricant to provide for proper operation of the actuator 36 with the source of air being controlled respectively through one or the other of the pipes 86, 87 to one or the other extremities of the actuator 36 to cause movement of its outward shaft 38 in one direction or the other. This will provide the opening and closing motion for the valve formed by the plate 30 and the mounting plate 20.

The electrical circuit for operating the electrically operating valve or solenoid valve 80 is shown schematically in FIGURE 6. This portion of the improved sampling device is normally mounted in a control console (not shown) located in proximity with the improved sampling device with electrical connections leading therefrom to the conductors 91, 92 of the electrical actuator or solenoid. Thus, as will be seen in FIGURE 6, the electrical portion of the improved sampling device is adapted to be connected to a source of alternating current, such as a 110 volt line, indicated, generally by the designation 100 applied to the input conductors of the electrical circuit. This circuit includes an on-off control switch 102 in the input conductors to the electrical circuit which may take the form of a single pole double throw switch. Also included in this input circuit is a fuse element 104 for limiting current flow in the control circuit. The electrical circuit includes in addition an indicating light 105 connected across the conductors 106, 107 extending from the on-off switch 102. This indicating light will provide an indication when power is applied to the electrical circuit through operation of the on-off switch 102. In addition to the on-off switch, the electrical circuit includes a pair of manually operated single throw double pole control switches indicated at 110, 112. These switches are adapted to provide by-pass circuits around an interval timing device, indicated by the block 120. The timing device controls the energization of a pair of timing relays or time delay relays shown by coils 122, 124 and a time delay controlled relay 126 respectively.

In the schematic circuit, the switch 110 designates a continuous run switch which is shown in the off position with the movable element thereof connected by a conductor 130 to the conductor 106 and one side of the source of power behind the on-off switch 102. In the off position, the switch is connected through a conductor 131 to the second switch 112, which is a momentary type switch. Switch 112, shown in the off position, has its off contact connected through a conductor 134 to a normally closed contact 135 of the timing reset relay 124 which has a short time delay in closing upon energization and a given time in delay in opening upon de-energization. The circuit from the contact 135 includes a coil 140 of a control relay within the interval timer 120 which has an internal two position switch indicated at 142 associated therewith. The circuit from the coil 140 is completed through the conductor 143 to the conductor 107 across the source of power. Also included in the timer 120 is the timing motor 145 which is connected to the conductor 143 and a conductor 147 leading to a first switch 148 driven thereby. The conductor 147 is connected to a normally closed contact of the timing motor switch 148 and the circuit is completed through a conductor 150 to a conductor 152 leading through the conductor 134 and the normally closed positions of the switches 110 and 112 to the conductor 106 of the source of power. Timing motor 145 of the timing device includes a second two position switch, indicated generally at 155, which switch has a normally open contact 157 connected to the relay coils 122, 124 and the conductor 107 with a normally closed contact of the switch 155, indicated at 160, being connected by a conductor 162 to the switch 142 of the relay 140. The switch 142 includes a conductor 163 connected to its normally open contact, which is connected to the coil 140 to provide a holding circuit for the same as will be later described. In addition, the control circuit includes conductors 165 connected to the normally open contact of the switch 110 and the normally open contact of the switch 112 which is connected through a conductor 167 to the normally open contact 157 of switch 155 of the timer motor 145 and to the timing relay and reset relay coils which in turn are connected to the conductor 107 of the source of power. For the purpose of the present disclosure, the timing relay 122 is merely a switching relay which has a normally open contact 170 that connects the control relay 126 or the coil thereof across the conductors 106, 107 to control the energization of the relay 126. The timing control relay 126 includes a normally open contact 174 which controls the energization of the solenoid 82 of valve 80. Contact 170 connects the conductor 106 to the coil 82 through its input conductors 91, 92 to complete the circuit across the source of power defined by the conductors 106, 107. Connected in parallel with the coil 82 of the valve is an indicating light 175 which provides an indication of the energization of the electrically operated valve to provide an indication of when the sampling device is in the open position.

In the operation of the improved sampling device the electrical control circuit will control the energization of the solenoid four-way valve 80 which in energized position will provide for a flow from the pressure source 83 through the filter 72, pressure regulating valve 74, and oil bath 77 to one extremity of the pneumatic actuator 36 causing it to move in a direction to slide the plate 30 on the mounting plate 20 and open the sliding valve of the sampling device. Since the pneumatic actuator is shown in a conventional form, the inlet air source would normally be directed to the inlet pipe 87 leading to the port 40 or coupling for the actuator and causing the shaft 38 of the actuator to draw within the confines of the cylindrical actuator moving the coupling members 54, 55 and the plate 30 toward the supporting guide flange 46, which also forms part of the adjustable stop controlling the size of opening of the sliding valve. This sliding valve is formed by the holes in the plates 30 and 20 and the degree of opening of the same is controlled or fixed by the adjustment of the guide flange 46 on the mounting plate 20. The upstanding portion of the flange 46 which engages the collar 61 on the coupling 54 will define the stop position which will regulate the opening in the plate members 20 and 30 from a full alignment position down to any degree of disalignment and hence varied size opening therebetween. This will control the size of the sample to be taken and is generally adjusted in accordance with the type of material being conveyed in the auger type conveyor or in a discharge chute. When the valve 80 is in its energized position, that is the position of the valve when the solenoid or coil portion 82 of the same is energized, the opposite pneumatic pipe or conductor 86 is connected to the opposite extremity or port 39 of the actuator with this connection extending through the four-way valve to the exhaust port 90 allowing air from this end of the actuator to be evacuated in the positioning of the same. For the opposite position of operation of the valves 80, that is, when the coil 82 controlling the same is de-energized, the valve porting through the valve 80 will be reversed and the outlet pipe 86 will be connected to the pneumatic source while the conduit or pipe 87 will be connected to the exhaust port 90 causing the actuator to be moved in the opposite direction shifting the plate 30 on the mounting plate 20 to a position of total disalignment with respect to the holes or apertures therein closing of the sliding valve. This limit position will be determined by the actual limit of movement of the actuator movable element and the shaft 38 thereof, hence no limiting device is required for this direction of movement.

The amount of time that the sliding valve of the plates 20 and 30 remains open is adjusted by the control elements in the electrical circuit of FIGURE 6. In this sense, the improved sampling device has three modes of operation. The first of these modes of operation is under control of the timing device 120. In this mode of operation, the continuous switch 110 and the manual switch 112 are in the off position such as that shown in the drawing. With this position for the circuit elements, and the on-off switch 102 closed, current will flow through the conductors 106, 107 to energize the indicating light 105 and indicate that the sampling device is in operation or is energized. A control circuit is provided to the timing device 120, that is, its motor 145 and relay 140 through a circuit which includes a conductor 130, switch 110, conductor 131, switch 112, conductor 134, normally closed contact 135 of the reset relay 124, coil 140, conductor 143, and conductor 107. In addition, the motor will be energized from the conductor 134 through the conductor 152, conductor 150, the normally closed contact of the timer driven switch 148 through conductor 147 to the timing motor and conductor 143 leading to the energizing conductor 107. Thus, the solenoid coil 140 and the motor 145 will be energized with the operation of the switch 102 for normal sampling operation and the timing device is of the type which is mechanically adjustable to provide for given time sequences between sampling operations for the sampling device. The motor 145 will operate for the mechanically adjusted time set in the timer after which period the relay contacts of the switches 155 and 148 will be shifted from their normally closed to the normally opened positions. At the start of energization of the timer, the relay 140 will close its contact 142 providing a holding circuit for the relay coil through the contact 160 of the timing motor 145. After the timing motor has completed its adjusted time cycle, and its contacts operate, the energizing circuit for the timing motor is broken by movement of the contacts of switch 148 from the normally closed to the normally open position. At this time, the switch 155 will connect the conductor 152 through the normally open contact 157 of the switch 155 providing an energizing circuit for the timing and reset relays 122, 124 or the coils thereof. The relay coil 122 and its contact 170 when energized will control the energization of the solenoid relay 126. The relay 126 is of the time delay type and will immediately close its contact 174 with the time delay being effective to delay the opening of the contact 174 after de-energization of the coil 126. The closure of the contact 174 for coil 126 will control the energization of the electrically operated valve through the energization of its coil 82 to cause the sliding plate types valve of the sampling device to move to an open position as previously described. Further the indicating light 175 will be energized to indicate that the actuator has moved to a position causing the sampling valve to open. With the energization of the coil 122, a simultaneous energization of the timing and reset relay 124 is effected, this relay being of the type that has the delayed energization of approximately 2 to 3 seconds before its normally closed contact 135 opens and a time delay upon reclosing of a slightly longer period after the coil element 124 has been de-energized. The operation of this relay effects the de-energization of the coil 140 since the normally closed contact 135 will open breaking the previous energization circuit for the same and being internally operative to effect the reset on the motor and switch mechanism associated therewith. The timing for reclosure of contact 135 will become effective when the contacts 148 and 155 of the timing motor have recycled to their normally de-energized position or start position in which the energizing circuit is broken for the coils 122 and 124. After de-energization of the coil 124, the contact 135 will reclose establishing the energizing circuit for the coil 140 and the timing motor will also be energized through the circuit previously described. The opening of the contact 170 of the switching relay will de-energize the coil 126 of the solenoid valve 80 but a time delay is effected on the opening of this device to provide a given time or desired time of opening of the sampling valve formed by the plates 20 and 30. When the circuits have completed their timing function and the coil 82 is de-energized, the sliding valve will move to a closed position ending the sampling operation and a new timing cycle will continue with energization of the motor 145 and operation of the switch associated with the coil 140. The frequency of this operation is determined by the mechanical adjustment in the timing device 120 (not shown) and we have found that an Eagle Timer type HP53A6 manufactured by the Eagle Timer Company is suitable for this purpose.

The second mode of operation of the sampling device is provided through the operation of the continuous switch 110 which is moved from its normally closed to its normally open position. The effect of this switching of the continuous switch 110 will be to by-pass the timer 120 and control the energization of the electrically operated valve 80 through energization of its solenoid 82 only by the relay 122 and the timing relay 126 associated therewith. The electrical control circuit in this mode of operation will provide a circuit from the conductor 106 through conductor 130 and the normally opened side of the switch 110 to conductor 165, and conductor 167 to the coils 122 and 124 which are connected to the opposite side of the source of power or conductor 107. For this condition of operation, the on-off switch 102 will be in the on position and the timer motor will be de-energized, but allowed to resume its normal timing cycle whenever the continuous switch is moved to its off position. The direct energization of the relay 122 will control the energization of the coil 126 through its contact 170 and allow for energization of the coil 82 through the contact 174 of timing relay 126 such that the sampling valve formed by the slidable plate 30 on the mounting plate 20 will remain continuously open and a continuous sample will be obtained.

A third mode of operation is one in which a sample is desired to be taken independent of the timing mechanism but only on a momentary basis and not a continuous basis. In this mode of operation, the switch 110 is in its off position and the manual switch 112 is momentarily deflected, shifting the contacts from the normally closed to the normally open position to complete the circuit through the conductor 130, switch 110, conductor 131, switch 112 to conductor 165, conductor 167 and the relays 122 and 124 which control the energization of the timing relay 126 and the coil 82 of the solenoid or electrically operated valve operating the slide valve of the sampling device. Momentary deflection of this switch 112 will cause energization of the relay 126 through the operation of the relay 122 and the closure of its contact 170 to energize the solenoid operated valve 80. Once energized, the valve will remain in a position of operation in which the slide valve will be opened for a period of time determined by the time delay of the relay 126 in the operation or opening of its contacts 174. Thus, an instantaneous sample can be obtained from the sampling device and discharged through the fitting 34 of the sampling device after which time the switch 112 will return to the normally off position connecting the timing mechanism or timer 120 in control of the energization of the valve 80 for operation of the same at the frequency determined by the adjustment of the timing mechanism 120.

Thus, it will be seen that we have provided an improved sampling device particularly applicable to auger type conveyors in which movement of the material being conveyed will be effective continuously without buildup of the same along the sides of the conveying tube because of the proximity with the auger therewith. This will assure an accurate sampling since the sampling device includes a slide valve positioned in close proximity with the conveying tube. The degree of opening of this valve is adjusted for given materials, and the length of time the valve will remain open will be adjusted by choosing or adjusting the timing mechanism in the electrical circuit as evidenced by the time delay relay 126 and its contact 174. Further, the frequency of sampling is determined by the adjustment of the timer 120 to provide for given cycles in the energization of the control valve 80 operating the actuator 36 for the slide valve. The gravity flow of the sample through the slide valve of the sampling device will be directed from the discharge chute 34 to any type of flexible conduit leading to a point where the sample is to be deposited for test purposes. The improved sampling device is relatively flat in construction and is readily mountable on the conveying tubes. The improved sampling device may be operated over wide ranges of frequency of sampling and may provide for a continuous sampling through operation of the control circuit by-passing the timer 120 and maintaining the slide valve opened for a continuous period. This will enable sampling along conveying lines continuously if desired, or at whatever frequency of timing which may be desired. Further, for spot checking of samples, the improved sampling device includes provision for momentary energization of the electrical control apparatus and operation of the solenoid valve controlling the operation of the actuator 36 and hence the operation of the sampling slide valve to obtain its sample instantaneously without time delay.

Therefore, in considering this invention, it should be remembered that the present disclosure is intended to be illustrative only and the scope of the invention should be determined only by the appended claims.

We claim:

1. In an automatic sampling device for an auger type conveying apparatus for granular and powdery type materials comprising: a curved mounting plate adapted to be mounted flush with the surface of a conveying tube having a generally circular cross section with an auger therein for conveying the material within the tube, said mounting plate being adapted to be positioned on the surface of said conveying tube adjacent a sample opening therein located approximately 45° from a vertical plane passing through the axis of said auger, a valve opening in said mounting plate being adapted to be aligned with the sample opening in the conveying tube when said curved mounting plate is mounted on said conveying tube, guide rails mounted on either side of said valve opening on said curved mounting plate, a second curved plate positioned between said guide rails being adapted to slide therebetween and including an opening with a discharge chute integral with and surrounding said opening, said curved plate forming with the opening in said curved mounting plate a sliding valve to control sample flow from said conveyor tube to said discharge chute, a shaft connected to said second plate and extending parallel to said curved mounting plate, guide means on said curved mounting plate for mounting said shaft, an actuator mounted on said curved mounting plate connected to said shaft for sliding said second plate relative to said first plate in the operation of said sliding valve, adjustable stop means included in part on said shaft and in part on said guide means for limiting movement of said second plate in one direction to limit the relationship of the openings in said first and second named plates and adjust the degree of opening of said sliding valve, and circuit means including an adjustable timer connected to said actuator to control the operation of the same.

2. In an automatic sampling device for an auger type conveying apparatus for granular and powdery type materials comprising; a curved mounting plate adapted to be mounted flush with the surface of a conveying tube having a generally circular cross section with an auger therein for conveying the material within the tube, said mounting plate being adapted to be positioned on the surface of said conveying tube adjacent a sample opening therein located approximately 45° from a vertical plane passing through the axis of said auger, a valve opening in said mounting plate adapted to be aligned with the sample opening in the conveying tube when said curved mounting plate is mounted on said conveying tube, guide rails mounted on either side of said valve opening on said curved mounting plate, a second curved plate positioned between said guide rails being adapted to slide therebetween and including an opening with a discharge chute integral with and surrounding said opening, said second curved plate forming with the opening in said curved mounting plate a sliding valve to control sample flow from said conveyor tube to said discharge chute, a shaft connected to said second plate and extending parallel to said curved mounting plate, a pneumatic actuator mounted on said curved mounting plate connected to said shaft for sliding said second plate relative to said first plate in the operation of said sliding valve, adjustable stop means included in part on said shaft and in part on said mounting plate for limiting movement of said second plate in one direction to limit the relationship of the openings in said first and second named plates and adjust the degree of opening of said sliding valve, a pneumatic source connected to said actuator for operating the same, and circuit means including electrically operated valve means and a timer for controlling the energization and operation of said electrically operated valve means for controlling the operation of said pneumatic actuator.

3. In an automatic sampling device for an auger type conveying apparatus for granular and powdery type materials comprising: a curved mounting plate adapted to be mounted flush with the surface of a conveying tube having a generally circular cross section with an auger therein for conveying the material within the tube, said mounting plate being adapted to be positioned on the surface of said conveying tube adjacent a sample opening therein located approximately 45° from a vertical plane passing through the axis of said auger, a valve opening in said mounting plate adapted to be aligned with the sample opening in the conveying tube when said curved mounting plate is mounted on said conveying tube, guide means mounted on either side of said valve opening on said plate, a second curved plate positioned between said guide means being adapted to slide therebetween and including an opening with a discharge chute integral with and surrounding said opening, said second curved plate forming with the opening in said curved mounting plate a sliding valve means to control sample flow from said conveyor tube to said discharge chute, a shaft connected to said second plate and extending parallel to said curved mounting plate, a fluid actuator mounted on said curved mounting plate connected to said shaft for sliding said second plate relative to said first plate in the operation of said sliding valve means, adjustable stop means included in part on said shaft and in part on said mounting plate for limiting movement of said second plate in one direction to limit the relationship of the openings in said first and second named plates and adjust the degree of opening of said sliding valve means, a fluid pressure source connected to said actuator for operating the same, and circuit means including electrically operated valve means for controlling fluid flow from said source to said actuator and a timer for controlling cyclically the energization and operation of said electrically operated valve means to control the operation of said actuator, said valve means formed by said first and second name plates being positioned in close proximity with the surface of the auger in said conveying tube.

4. In an automatic sampling device for an auger type conveying apparatus for granular and powdery type materials comprising: a thin flat mounting plate adapted to be mounted flush with the surface of a conveying tube having an auger therein for conveying the material fitting substantially flush with the surface of said tube, said mounting plate adapted to be positioned on the surface of said conveying tube adjacent a sample opening therein located below the axis of rotation of the auger for gravity flow from the sample opening in said conveying tube, a valve opening in said mounting plate adapted to be aligned with the sample opening in the conveying tube, guide means mounted on said mounting plate, a second thin flat plate positioned on said guide means being adapted to slide therebetween and including an opening with a discharge chute integral with and surrounding said opening, said second thin flat plate forming with the opening in said mounting plate a sliding valve means to control sample flow from said conveyor tube to said discharge chute, a shaft connected to said second plate and extending parallel to said thin flat mounting plate, an actuator mounted on said thin flat mounting plate connected to said shaft for sliding said second plate relative to said first plate in the operation of said sliding valve means, adjustable stop means included in part on said shaft and in part on said mounting plate for limiting movement of said second plate in one direction to limit the relationship of the openings in said first and second named plates and adjust the degree of opening of said sliding valve means, and circuit means including an adjustable timer connected to said actuator to control the cyclic operation of the same.

5. In an automatic sampling device for an auger type conveying apparatus for granular and powdery type materials comprising: a thin flat mounting plate adapted to be mounted flush with the surface of a conveying tube having an auger therein for conveying the material fitting substantially flush with the surface of said tube, said mounting plate adapted to be positioned on the surface of said conveying tube adjacent a sample opening therein located below the axis of rotation of the auger for gravity flow from the sample opening in said conveying tube, a valve opening in said mounting plate adapted to be aligned with the sample opening in the conveying tube, guide means mounted on said mounting plate, a second thin flat plate mounted on said guide means being adapted to slide therebetween and including an opening with a discharge chute integral with and surrounding said opening, said second thin flat plate forming with the valve opening on said mounting plate a sliding valve to control sample flow from said conveyor tube to said discharge chute, a shaft connected to said second plate and extending parallel to said thin flat mounting plate, a fluid actuator mounted on said thin flat mounting plate connected to said shaft for sliding said second plate relative to said first plate in the operation of said sliding valve, adjustable stop means included in part on said shaft and in part on said mounting plate for limiting movement of said second plate in one direction to limit the relationship of the openings in said first and second named plates and adjust the degree of opening of said sliding valve, a second valve and a source of fluid power connected to said actuator, and circuit means including an adjustable timer connected to said second valve to control cyclically the operation of the same.

6. In an automatic sampling device for an auger type conveying apparatus for granular and powdery type materials comprising: a curved mounting plate adapted to be mounted flush with the surface of a conveying tube having a generally circular cross section with an auger therein for conveying the material within the tube, said mounting plate being adapted to be positioned on the surface of said conveying tube adjacent a sample opening therein located below the axis of said auger, a circular valve opening in said mounting plate adapted to be aligned with the sample opening in the conveying tube when said curved mounting plate is mounted on said conveying tube, guide rails mounted on either side of said valve opening on said plate, a second curved plate positioned between said guide rails being adapted to slide therebetween and including an opening of the same dimension as the opening in said mounting plate, a discharge chute mounted on said second curved plate around the opening therein, said second curved plate forming with the opening in said mounting plate, a sliding valve to control sample flow from said conveyor tube to said discharge chute, a shaft connected to said second plate and extending parallel to said curved mounting plate, an actuator mounted on said curved mounting plate and connected to said shaft for sliding said second plate relative to said first plate in the operation of said sliding valve, adjustable stop means included in part on said shaft and in part on said mounting plate for limiting movement of said second plate in one direction to limit the relationship of the openings in said first and second named plates and adjust the degree of opening of said sliding valve, and means including circuit means having an adjustable timing means connected to said actuator to control the frequency and length of operation of the sliding valve.

7. In an automatic sampling device for an auger type conveying apparatus for granular and powdery type materials comprising: a thin flat mounting plate adapted to be mounted flush with the surface of a conveying tube having an auger therein for conveying the material and fitting substantially flush with the surface of said conveying tube, said mounting plate adapted to be positioned on the surface of said conveying tube adjacent a sample opening therein and located below the axis of rotation of the auger for gravity flow from the sample opening in said conveying tube, a valve opening in said mounting plate adapted to be aligned with the sample opening in the conveying tube, guide rails mounted on either side of said valve opening on said plate, a second thin flat plate positioned between said guide rails and adapted to slide therebetween said second plate including an opening with a discharge chute encircling said opening, said second thin flat plate forming with the opening in said mounting plate a sliding valve means to control sample flow from said conveyor tube to said discharge chute, a shaft connected to said second plate and extending parallel to said thin flat mounting plate, a pneumatic actuator mounted on said thin flat mounting plate and connected to said shaft for sliding said second plate relative to said first plate in the operation of said sliding valve means, adjustable stop means included in part on said shaft and in part on said mounting plate for limiting movement of said second plate to limit the relationship of the openings in said first and second named plates and adjust the degree of opening of said sliding valve means, a pneumatic source and an electrically operated valve means connected to said actuator for operating the same, and circuit means including said electrically operated valve means and a timer for controlling the energization and operation of said electrically operated valve means for controlling the frequency and period of operation of said actuator.

8. In an automatic sampling device for an auger type conveying apparatus for granular and powdery type materials comprising: a curved mounting plate adapted to be mounted flush with the surface of a conveying tube having a generally circular cross section with an auger therein for conveying the material within the tube, said mounting plate adapted to be positioned on the surface of said conveying tube adjacent a sample opening therein located approximately below the axis of said auger, a valve opening in said mounting plate adapted to be aligned with the sample opening in the conveying tube when said curved mounting plate is mounted on said conveying tube, guide means mounted on said curved mounting plate, a second curved plate mounted on said guide means and adapted to slide thereon said second curved plate including an opening with a discharge chute encircling said opening, said second curved plate forming with the opening in said mounting plate a sliding valve to control sample flow from said conveyor tube to said discharge chute, a shaft connected to said second plate and extending parallel to said curved mounting plate, an actuator mounted on said curved mounting plate and connected to said shaft for sliding said second plate relative to said first plate in the operation of said sliding valve, adjustable stop means included in part on said shaft and in part on said mounting plate for limiting movement of said second plate to limit the relationship of the openings in said first and second named plates and adjust the degree of opening of said sliding valve, means including circuit means having an adjustable timer connected to said actuator to control the frequency of operation of the actuator and time delay means to control the length of time the actuator is operated, and additional circuit means including switch means included in said first named circuit means for by-passing the control of the energization of said actuator by said timer for manual operation of said sampling device.

9. In an automatic sampling device for conveying apparatus for granular and powdery type materials comprising: a curved mounting plate adapted to be mounted flush with the surface of a conveying tube, said mounting plate being adapted to be positioned on the surface of said conveying tube adjacent a sample opening therein, a valve opening in said mounting plate being adapted to be aligned with the sample opening in the conveying tube when said curved mounting plate is mounted on said conveying tube, guide rails mounted on either side of said valve opening on said curved mounting plate, a second curved plate positioned between said guide rails being adapted to slide therebetween, said second curved plate forming with the opening in said curved mounting plate a sliding valve to control sample flow from said conveyor tube, a shaft connected to said second plate and extending parallel to said curved mounting plate, guide means on said curved mounting plate for mounting said shaft, an actuator mounted on said curved mounting plate connected to said shaft for sliding said second plate relative to said first plate in the operation of said sliding valve, adjustable stop means included in part on said shaft and in part on said guide means for limiting movement of said second plate in one direction to limit the relationship of the openings in said first and second named plates and adjust the degree of opening of said sliding valve, and circuit means including an adjustable timer connected to said actuator to control the operation of the same.

10. In an automatic sampling device for conveying apparatus for granular and powdery type materials comprising: a thin flat mounting plate adapted to be mounted flush with the surface of a conveying tube for conveying the material fitting substantially flush with the surface of said tube, said mounting plate adapted to be positioned on the surface of said conveying tube adjacent a sample opening therein located for gravity flow from the sample opening in said conveying tube, a valve opening in said mounting plate adapted to be aligned with the sample opening in the conveying tube, guide means mounted on said mounting plate, a second thin flat plate positioned on said guide means being adapted to slide therebetween and including an opening, said second thin flat plate forming with the opening in said mounting plate a sliding valve means to control sample flow from said conveyor tube, a shaft connected to said second plate and extending parallel to said thin flat mounting plate, an actuator mounted on said thin flat mounting plate connected to said shaft for sliding said second plate relative to said first plate in the operation of said sliding valve means, adjustable stop means included in part on said shaft and in part on said mounting plate for limiting movement of said second plate in one direction to limit the relationship of the openings in said first and second named plates and adjust the degree of opening of said sliding valve means, and circuit means including an adjustable timer connected to said actuator to control the cyclic operation of the same.

11. In an automatic sampling device for conveying apparatus for granular and powdery type materials comprising: a mounting plate adapted to be mounted on the surface of a conveying tube for conveying the material, said mounting plate adapted to be positioned on the surface of said conveying tube adjacent a sample opening therein located for gravity flow from the sample opening in said conveying tube, a valve opening in said mounting plate adapted to be aligned with the sample opening in the conveying tube, guide means mounted on said mounting plate, a second plate positioned on said guide means being adapted to slide therebetween and including an opening, said second plate forming with the opening in said mounting plate a sliding valve means to control sample flow from said conveyor tube, a shaft connected to said second plate and extending parallel to said mounting plate, an actuator mounted on said mounting plate connected to said shaft for sliding said second plate relative to said first plate in the operation of said sliding valve means, adjustable stop means included in part on said shaft and in part on said mounting plate for limiting movement of said second plate in one direction to limit the relationship of the openings in said first and second named plates and adjust the degree of opening of said sliding valve means, and circuit means including an adjustable timer connected to said actuator to control the cyclic operation of the same.

References Cited by the Examiner
UNITED STATES PATENTS

| | | | |
|---|---|---|---|
| 1,860,107 | 5/1932 | Lien | 73—421 |
| 1,944,963 | 1/1934 | Bradford et al. | 73—423 |
| 2,489,592 | 11/1949 | Shaeffer | 73—423 |

RICHARD C. QUEISSER, *Primary Examiner.*